United States Patent
Ghosh et al.

(10) Patent No.: US 8,717,874 B2
(45) Date of Patent: *May 6, 2014

(54) UPDATING A SWITCH SOFTWARE IMAGE IN A DISTRIBUTED FABRIC PROTOCOL (DFP) SWITCHING NETWORK

(75) Inventors: Nirapada Ghosh, Sunnyvale, CA (US); Dayavanti G Kamath, Santa Clara, CA (US); Keshav Kamble, Fremont, CA (US); Dar-Ren Leu, San Jose, CA (US); Nilanjan Mukherjee, Santa Clara, CA (US); Vijoy Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,047

(22) Filed: Aug. 27, 2012

(65) Prior Publication Data

US 2013/0067049 A1 Mar. 14, 2013

Related U.S. Application Data

(63) Continuation of application No. 13/229,867, filed on Sep. 12, 2011.

(51) Int. Cl.
*G01R 31/08* (2006.01)

(52) U.S. Cl.
USPC ............................. 370/216; 370/219; 370/220

(58) Field of Classification Search
USPC .......................................... 370/216, 219, 220
See application file for complete search history.

(56) References Cited

U.S. PATENT DOCUMENTS

| | | | |
|---|---|---|---|
| 5,394,402 A | 2/1995 | Ross | |
| 5,515,359 A | 5/1996 | Zheng | |

(Continued)

FOREIGN PATENT DOCUMENTS

| | | |
|---|---|---|
| CN | 1897567 | 1/2007 |
| CN | 101030959 A | 9/2007 |
| CN | 101087238 | 12/2007 |
| EP | 0853405 | 7/1998 |

OTHER PUBLICATIONS

Martin, et al., "Accuracy and Dynamics of Multi-Stage Load Balancing for Multipath Internet Routing", Institute of Computer Science, Univ. of Wurzburg Am Hubland, Germany, IEEE Int'l Conference on Communications (ICC) Glasgow, UK, pp. 1-8, Jun. 2007.

(Continued)

*Primary Examiner* — Yemane Mesfin
*Assistant Examiner* — Jeff Banthrongsack
(74) *Attorney, Agent, or Firm* — Yudell Isidore Ng Russell PLLC

(57) ABSTRACT

A switching network has a plurality of switches including at least a switch and a managing master switch. At the managing master switch, a first capability vector (CV) is received from the switch. The managing master switch determines whether the first CV is compatible with at least a second CV in a network membership data structure that records CVs of multiple switches in the switching network. In response to detecting an incompatibility, the managing master switch initiates an image update to an image of the switch. In response to a failure of the image update at the switch, the switch boots utilizing a mini-DC module that reestablishes communication between the switch with the managing master switch and retries the image update.

8 Claims, 7 Drawing Sheets

(56) References Cited

U.S. PATENT DOCUMENTS

| | | | |
|---|---|---|---|
| 5,617,421 A | 4/1997 | Chin et al. | |
| 5,633,859 A | 5/1997 | Jain et al. | |
| 5,633,861 A | 5/1997 | Hanson et al. | |
| 5,742,604 A | 4/1998 | Edsall et al. | |
| 5,893,320 A | 4/1999 | Demaree | |
| 6,147,970 A | 11/2000 | Troxel | |
| 6,304,901 B1 | 10/2001 | McCloghrie et al. | |
| 6,347,337 B1 | 2/2002 | Shah et al. | |
| 6,567,403 B1 | 5/2003 | Congdon et al. | |
| 6,646,985 B1 | 11/2003 | Park et al. | |
| 6,839,768 B2 | 1/2005 | Ma et al. | |
| 6,901,452 B1 | 5/2005 | Bertagna | |
| 7,035,220 B1 | 4/2006 | Simcoe | |
| 7,263,060 B1 | 8/2007 | Garofalo et al. | |
| 7,483,370 B1* | 1/2009 | Dayal et al. | 370/219 |
| 7,561,517 B2 | 7/2009 | Klinker et al. | |
| 7,593,320 B1 | 9/2009 | Cohen et al. | |
| 7,668,966 B2 | 2/2010 | Klinker et al. | |
| 7,830,793 B2 | 11/2010 | Gai et al. | |
| 7,839,777 B2 | 11/2010 | DeCusatis et al. | |
| 7,848,226 B2 | 12/2010 | Morita | |
| 7,912,003 B2 | 3/2011 | Radunovic et al. | |
| 7,974,223 B2 | 7/2011 | Zelig et al. | |
| 8,139,358 B2 | 3/2012 | Tambe | |
| 8,194,534 B2 | 6/2012 | Pandey et al. | |
| 8,213,429 B2 | 7/2012 | Wray et al. | |
| 8,265,075 B2 | 9/2012 | Pandey | |
| 8,271,680 B2 | 9/2012 | Salkewicz | |
| 8,325,598 B2 | 12/2012 | Krzanowski | |
| 8,345,697 B2 | 1/2013 | Kotha et al. | |
| 8,406,128 B1 | 3/2013 | Brar et al. | |
| 8,498,299 B2 | 7/2013 | Katz et al. | |
| 2002/0191628 A1 | 12/2002 | Liu et al. | |
| 2003/0185206 A1 | 10/2003 | Jayakrishnan | |
| 2004/0031030 A1* | 2/2004 | Kidder et al. | 717/172 |
| 2004/0088451 A1 | 5/2004 | Han | |
| 2004/0243663 A1 | 12/2004 | Johanson et al. | |
| 2004/0255288 A1 | 12/2004 | Hashimoto et al. | |
| 2005/0047334 A1 | 3/2005 | Paul et al. | |
| 2006/0029072 A1 | 2/2006 | Perera et al. | |
| 2006/0251067 A1 | 11/2006 | DeSanti et al. | |
| 2007/0263640 A1 | 11/2007 | Finn | |
| 2008/0205377 A1 | 8/2008 | Chao et al. | |
| 2008/0225712 A1 | 9/2008 | Lange | |
| 2008/0228897 A1 | 9/2008 | Ko | |
| 2009/0129385 A1 | 5/2009 | Wray et al. | |
| 2009/0185571 A1 | 7/2009 | Tallet | |
| 2009/0213869 A1 | 8/2009 | Rajendran et al. | |
| 2009/0252038 A1 | 10/2009 | Cafiero et al. | |
| 2010/0054129 A1 | 3/2010 | Kuik et al. | |
| 2010/0054260 A1 | 3/2010 | Pandey et al. | |
| 2010/0158024 A1 | 6/2010 | Sajassi et al. | |
| 2010/0183011 A1 | 7/2010 | Chao | |
| 2010/0223397 A1 | 9/2010 | Elzur | |
| 2010/0226368 A1 | 9/2010 | Mack-Crane et al. | |
| 2010/0246388 A1 | 9/2010 | Gupta et al. | |
| 2010/0265824 A1 | 10/2010 | Chao et al. | |
| 2010/0303075 A1 | 12/2010 | Tripathi et al. | |
| 2011/0007746 A1 | 1/2011 | Mudigonda et al. | |
| 2011/0019678 A1 | 1/2011 | Mehta et al. | |
| 2011/0026403 A1 | 2/2011 | Shao et al. | |
| 2011/0026527 A1 | 2/2011 | Shao et al. | |
| 2011/0032944 A1 | 2/2011 | Elzur et al. | |
| 2011/0035494 A1 | 2/2011 | Pandey et al. | |
| 2011/0103389 A1 | 5/2011 | Kidambi et al. | |
| 2011/0134793 A1 | 6/2011 | Elsen et al. | |
| 2011/0235523 A1 | 9/2011 | Jha et al. | |
| 2011/0280572 A1 | 11/2011 | Vobbilisetty et al. | |
| 2011/0299406 A1 | 12/2011 | Vobbilisetty et al. | |
| 2011/0299409 A1 | 12/2011 | Vobbilisetty et al. | |
| 2011/0299532 A1 | 12/2011 | Yu et al. | |
| 2011/0299536 A1 | 12/2011 | Cheng et al. | |
| 2012/0014261 A1 | 1/2012 | Salam et al. | |
| 2012/0014387 A1 | 1/2012 | Dunbar et al. | |
| 2012/0177045 A1 | 7/2012 | Berman | |
| 2012/0228780 A1 | 9/2012 | Kim et al. | |
| 2012/0243539 A1 | 9/2012 | Keesara | |
| 2012/0243544 A1 | 9/2012 | Keesara | |
| 2012/0287786 A1 | 11/2012 | Kamble et al. | |
| 2012/0287787 A1 | 11/2012 | Kamble et al. | |
| 2012/0287939 A1 | 11/2012 | Leu et al. | |
| 2012/0320749 A1 | 12/2012 | Kamble et al. | |
| 2013/0022050 A1 | 1/2013 | Leu et al. | |
| 2013/0051235 A1 | 2/2013 | Song et al. | |
| 2013/0064067 A1 | 3/2013 | Kamath et al. | |
| 2013/0064068 A1 | 3/2013 | Kamath et al. | |

OTHER PUBLICATIONS

Kinds, et al., "Advanced Network Monitoring Brings Life to the Awareness Plane", IBM Research Spyros Denazis, Univ. of Patras Benoit Claise, Cisco Systems, IEEE Communications Magazine, pp. 1-7, Oct. 2008.

Kandula, et al., "Dynamic Load Balancing Without Packet Reordering", ACM SIGCOMM Computer Communication Review, vol. 37, No. 2, pp. 53-62, Apr. 2007.

Vazhkudai, et al., "Enabling the Co-Allocation of Grid Data Transfers", Department of Computer and Information Sciences, The Univ. of Mississippi, pp. 44-51, Nov. 17, 2003.

Xiao, et al. "Internet QoS: A Big Picture", Michigan State University, IEEE Network, pp. 8-18, Mar./Apr. 1999.

Jo et al., "Internet Traffic Load Balancing using Dynamic Hashing with Flow Volume", Conference Title: Internet Performance and Control of Network Systems III, Boston, MA pp. 1-12, Jul. 30, 2002.

Schueler et al., "TCP-Splitter: A TCP/IP Flow Monitor in Reconfigurable Hardware", Appl. Res. Lab., Washington Univ. pp. 54-59, Feb. 19, 2003.

Yemini et al., "Towards Programmable Networks"; Dept. of Computer Science Columbia University, pp. 1-11, Apr. 15, 1996.

Soule, et al., "Traffic Matrices: Balancing Measurements, Interference and Modeling", vol. 33, Issue: 1, Publisher: ACM, pp. 362-373, Year 2005.

De-Leon, "Flow Control for Gigabit", Digital Equipment Corporation (Digital), IEEE 802.3z Task Force, Jul. 9, 1996.

Schlansker, et al., "High-Performance Ethernet-Based Communications for Future Multi-Core Processors", Proceedings of the 2007 ACM/IEEE conference on Supercomputing, Nov. 10-16, 2007.

Yoshigoe, et al., "Rate Control for Bandwidth Allocated Services in IEEE 802.3 Ethernet", Proceedings of the 26th Annual IEEE Conference on Local Computer Networks, Nov. 14-16, 2001.

Tolmie, "HIPPI-6400—Designing for speed", 12th Annual Int'l Symposium on High Performance Computing Systems and Applications (HPCSt98), May 20-22, 1998.

Manral, et al., "Rbridges: Bidirectional Forwarding Detection (BFD) support for TRILL draft-manral-trill-bfd-encaps-01", pp. 1-10, TRILL Working Group Internet-Draft, Mar. 13, 2011.

Perlman, et al., "Rbridges: Base Protocol Specification", pp. 1-117, TRILL Working Group Internet-Draft, Mar. 3, 2010.

D.E. Eastlake, "Rbridges and the IETF TRILL Protocol", pp. 1-39, TRILL Protocol, Dec. 2009.

Leu, Dar-Ren, "dLAG-DMLT over TRILL", BLADE Network Technologies, pp. 1-20, Copyright 2009.

Posted by Mike Fratto, "Cisco's FabricPath and IETF TRILL: Cisco Can't Have Standards Both Ways", Dec. 17, 2010; http://www.networkcomputing.com/data-networking-management/229500205.

Cisco Systems Inc., "Cisco FabricPath Overview", pp. 1-20, Copyright 2009.

Brocade, "BCEFE in a Nutshell First Edition", Global Education Services Rev. 0111, pp. 1-70, Copyright 2011, Brocade Communications Systems, Inc.

Pettit et al., Virtual Switching in an Era of Advanced Edges, pp. 1-7, Nicira Networks, Palo Alto, California. Version date Jul. 2010.

Pfaff et al., Extending Networking into the Virtualization Layer, pp. 1-6, Oct. 2009, Proceedings of the 8th ACM Workshop on Hot Topics in Networks (HotNets-VIII), New York City, New York.

Sherwood et al., FlowVisor: A Network Virtualization Layer, pp. 1-14, Oct. 14, 2009, Deutsche Telekom Inc. R&D Lab, Stanford University, Nicira Networks.

(56) References Cited

OTHER PUBLICATIONS

Yan et al., Tesseract: A 4D Network Control Plane, pp. 1-15, NSDI'07 Proceedings of the 4th USENIX conference on Networked systems design & implementation USENIX Association Berkeley, CA, USA 2007.
Hunter et al., BladeCenter, IBM Journal of Research and Development, vol. 49, No. 6, p. 905. Nov. 2005.
VMware, Inc., "VMware Virtual Networking Concepts", pp. 1-12, Latest Revision: Jul. 29, 2007.
Perla, "Profiling User Activities on Guest OSes in a Virtual Machine Environment." (2008).
Shi et al., Architectural Support for High Speed Protection of Memory Integrity and Confidentiality in Multiprocessor Systems, pp. 1-12, Proceedings of the 13th International Conference on Parallel Architecture and Compilation Techniques (2004).
Guha et al., ShutUp: End-to-End Containment of Unwanted Traffic, pp. 1-14, (2008).
Recio et al., Automated Ethernet Virtual Bridging, pp. 1-11, IBM 2009.
Sproull et al., "Control and Configuration Software for a Reconfigurable Networking Hardware Platform", Applied Research Laboratory, Washington University, Saint Louis, MO 63130; pp. 1-10 (or 45-54)—Issue Date: 2002, Date of Current Version: Jan. 6, 2003.
Papadopoulos et al.,"NPACI Rocks: Tools and Techniques for Easily Deploying Manageable Linux Clusters", The San Diego Supercomputer Center, University of California San Diego, La Jolla, CA 92093-0505—Issue Date: 2001, Date of Current Version: Aug. 7, 2002.
Ruth et al., Virtual Distributed Environments in a Shared Infrastructure, pp. 63-69, IEEE Computer Society, May 2005.
"Rouiller, Virtual LAN Security: weaknesses and countermeasures, pp. 1-49, GIAC Security Essentials Practical Assignment Version 1.4b".
Walters et al., An Adaptive Heterogeneous Software DSM, pp. 1-8, Columbus, Ohio, Aug. 14-Aug. 18.
Skyrme et al., Exploring Lua for Concurrent Programming, pp. 3556-3572, Journal of Universal Computer Science, vol. 14, No. 21 (2008), submitted: Apr. 16, 2008, accepted: Jun. 5, 2008, appeared: Dec. 1, 2008.
Dobre, Multi-Architecture Operating Systems, pp. 1-82, Oct. 4, 2004.
Int'l Searching Authority; Int. Appln. PCT/IB2012/051803; Int'l Search Report dated Sep. 13, 2012 (7 pg.).
U.S. Appl. No. 13/107,893, Notice of Allowance Dated Jul. 10, 2013.
U.S. Appl. No. 13/107,893, Non-Final Office Action Dated Apr. 1, 2013.
U.S. Appl. No. 13/472,964, Notice of Allowance Dated Jul. 12, 2013.
U.S. Appl. No. 13/472,964, Non-Final Office Action Dated Mar. 29, 2013.
U.S. Appl. No. 13/107,903, Notice of Allowance Dated Sep. 11, 2013.
U.S. Appl. No. 13/107,903, Final Office Action Dated Jul. 19, 2013.
U.S. Appl. No. 13/107,903, Non-Final Office Action Dated Feb. 22, 2013.
U.S. Appl. No. 13/585,446, Notice of Allowance Dated.
U.S. Appl. No. 13/585,446, Final Office Action Dated Jul. 19, 2013.
U.S. Appl. No. 13/585,446, Non-Final Office Action Dated Feb. 16, 2013.
U.S. Appl. No. 13/107,894, Non-Final Office Action Dated Jun. 20, 2013.
U.S. Appl. No. 13/594,970, Final Office Action Dated Sep. 25, 2013.
U.S. Appl. No. 13/594,970, Non-Final Office Action Dated May 29, 2013.
U.S. Appl. No. 13/107,397, Final Office Action Dated May 29, 2013.
U.S. Appl. No. 13/107,397, Non-Final Office Action Dated Jan. 4, 2013.
U.S. Appl. No. 13/466,754, Non-Final Office Action Dated Sep. 25, 2013.
U.S. Appl. No. 13/229,867, Non-Final Office Action Dated May 24, 2013.
U.S. Appl. No. 13/595,047, Non-Final Office Action Dated May 24, 2013.
U.S. Appl. No. 13/107,985, Notice of Allowance Dated Jul. 18, 2013.
U.S. Appl. No. 13/107,985, Non-Final Office Action Dated Feb. 28, 2013.
U.S. Appl. No. 13/107,433, Final Office Action Dated Jul. 10, 2013.
U.S. Appl. No. 13/107,433, Non-Final Office Action Dated Jan. 28, 2013.
U.S. Appl. No. 13/466,790, Final Office Action Dated Jul. 12, 2013.
U.S. Appl. No. 13/466,790, Non-Final Office Action Dated Feb. 15, 2013.
U.S. Appl. No. 13/107,554, Final Office Action Dated Jul. 3, 2013.
U.S. Appl. No. 13/107,554, Non-Final Office Action Dated Jan. 8, 2013.
U.S. Appl. No. 13/229,891, Non-Final Office Action Dated May 9, 2013.
U.S. Appl. No. 13/595,405, Non-Final Office Action Dated May 9, 2013.
U.S. Appl. No. 13/107,896, Notice of Allowance Dated Jul. 29, 2013.
U.S. Appl. No. 13/107,896, Non-Final Office Action Dated Mar. 7, 2013.
U.S. Appl. No. 13/267,459, Non-Final Office Action Dated May 2, 2013.
U.S. Appl. No. 13/267,578, Non-Final Office Action Dated Aug. 6, 2013.
U.S. Appl. No. 13/267,578, Non-Final Office Action Dated Apr. 5, 2013.
U.S. Appl. No. 13/314,455, Final Office Action Dated Aug. 30, 2013.
U.S. Appl. No. 13/314,455, Non-Final Office Action Dated Apr. 24, 2013.

\* cited by examiner

UPDATING A SWITCH SOFTWARE IMAGE IN A DISTRIBUTED FABRIC PROTOCOL (DFP) SWITCHING NETWORK

This application is a continuation of U.S. patent application Ser. No. 13/229,867 entitled "UPDATING A SWITCH SOFTWARE IMAGE IN A DISTRIBUTED FABRIC PROTOCOL (DFP) SWITCHING NETWORK," by Nirapada Ghosh et al., filed on Sep. 12, 2011, the disclosure of which is incorporated herein by reference in its entirety for all purposes.

BACKGROUND OF THE INVENTION

1. Technical Field

The present invention relates in general to network communication and, in particular, to a system for managing the update of software images for computer networks.

2. Description of the Related Art

As is known in the art, a communications network is a collection of terminals, links, and nodes connected together to enable communication between users of the terminals. Each terminal in the network must have a unique address so messages or connections can be routed to the correct recipients. Messages are generated by a sending or source terminal, then pass through the intermediate network of links and nodes until they arrive at the receiving or destination terminal. The intermediate network nodes handle these messages and route them down the correct network link towards their final destination terminal.

A large communications network typically includes a many switches, which operate independently at the management, control and data planes. Consequently, in conventional networks, each switch must be individually configured, since each switch implements its own means of handling data, control, and management traffic. Moreover, each switch forwards data, control, and management traffic independently of similar traffic handled by any other of the switches.

To maintain and/or improve network communication, software or firmware updates to installed network infrastructure (including network switches) are required occasionally. Further, network capacity and functionality is enhanced by installing new switches and/or replacing older switches.

SUMMARY OF THE INVENTION

In accordance with at least one embodiment, methods, systems and program products for updating system image(s) in a heterogeneous packet-switched network are disclosed.

In at least one embodiment of a switching network, the switching network has a plurality of switches including at least a switch and a managing master switch. At the managing master switch, a first capability vector (CV) is received from the switch. The managing master switch determines whether the first CV is compatible with at least a second CV in a network membership data structure that records CVs of multiple switches in the switching network. In response to detecting an incompatibility, the managing master switch initiates an image update to an image of the switch. In response to a failure of the image update at the switch, the switch boots utilizing a mini-DC module that reestablishes communication between the switch with the managing master switch and retries the image update.

DETAILED DESCRIPTION OF ILLUSTRATIVE EMBODIMENT

Disclosed herein are methods, systems and program products for updating system image(s) in a heterogeneous packet-switched network, which may include switches from multiple vendors and/or switches with differing hardware and/or software. The update(s) of switch image(s) is/are preferably centrally managed by a managing master switch in the packet-switched network. By updating the system images of one or more switches in the packet-switched network, the managing master switch brings the packet-switched network into a consistent state in which all member switches of the packet-switched network are running the same or compatible switch images.

Figure 1:
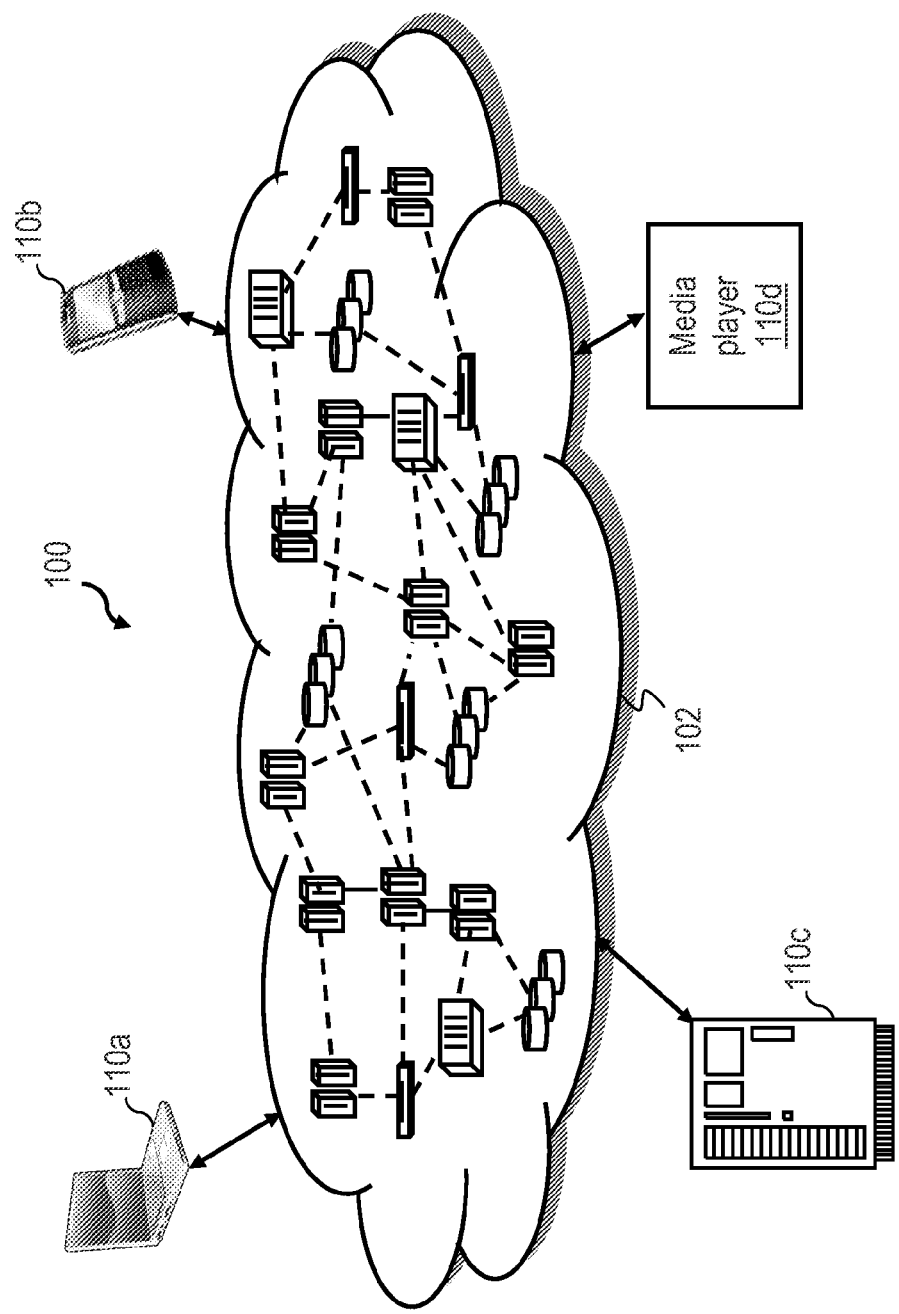
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100 includes a collection of resources 102. Resources 102, which may include various hosts, clients, switches, routers, storage, etc., are interconnected for communication and may be grouped (not shown) physically or virtually, in one or more public, private, community, public, or cloud networks or a combination thereof. In this manner, data processing environment 100 can offer infrastructure, platforms, software and/or services accessible to various client devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of client devices 110 shown in FIG. 1 are illustrative only and that client devices 110 can be any type of electronic device capable of communicating with and accessing resources 102 via a packet network.

Figure 2:
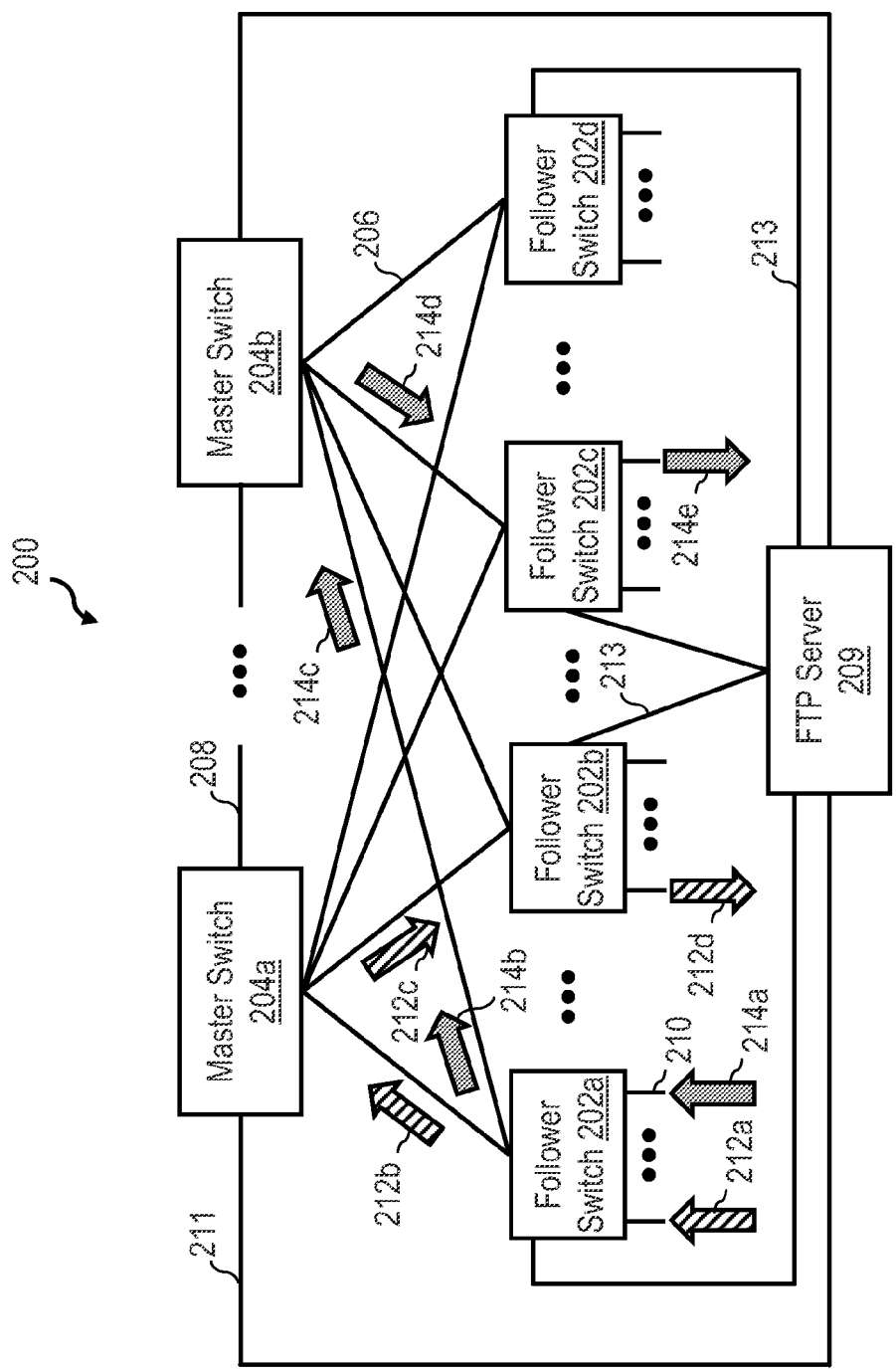
FIG. 2 is a high level block diagram of one embodiment of a distributed fabric protocol (DFP) switching network architecture that can be implemented within the data processing environment of FIG. 1.

Referring now to FIG. 2, there is illustrated a high level block diagram of an exemplary distributed fabric protocol (DFP) switching network architecture that may be implemented within resources 102 in accordance with one embodiment. In the illustrated exemplary embodiment, resources 102 include a plurality of physical and/or virtual network switches forming a DFP switching network 200. In contrast to conventional network environments in which each switch implements independent management, control, and data planes, DFP switching network 200 implements unified management, control and data planes, enabling all the constituent member switches to be viewed as a unified virtualized switch, thus simplifying deployment, configuration, and management of the network fabric, as discussed further herein.

DFP switching network 200 includes two or more tiers of switches, which in the instant embodiment includes a lower tier having a plurality of follower switches, including follower switches 202a-202d, and an upper tier having a plurality of master switches, including master switches 204a-204b. In an embodiment with two tiers as shown, a port of each master switch 204 is directly connected by one of inter-tier links 206 to one of the ports of each follower switch 202, and a port of each master switch 204 is coupled directly or indirectly to a port at least one other master switch 204 by a master link 208. A port of each master switch 204a-204b and follower switch 202a-202d is coupled directly or indirectly to a port of File Transfer Protocol (FTP) server 209 by server-switch links 211 and 213. When such distinctions are relevant, ports supporting switch-to-switch communication via inter-tier links 206 are referred to herein as "inter-switch ports," and other ports (e.g., of follower switch 202a-202d and FTP server 209) are referred to as "data ports."

In a preferred embodiment, follower switches 202 are configured to operate on the data plane in a pass-through mode, meaning that all ingress data traffic received at data ports 210 of follower switches 202 (e.g., from host platforms) is forwarded by follower switches 202 via inter-switch ports and inter-tier links 206 to one of master switches 204. Master switches 204 in turn serve as the fabric for the data traffic (hence the notion of a distributed fabric) and implement all packet switching and routing for the data traffic. With this arrangement data traffic may be forwarded, for example, in the first exemplary flow indicated by arrows 212a-212d and the second exemplary flow indicated by arrows 214a-214e.

As will be appreciated, the centralization of data plane switching and routing for follower switches 202 in master switches 204 implies that master switches 204 have knowledge of the ingress data ports of follower switches 202 on which data traffic was received. In a preferred embodiment, switch-to-switch communication via links 206, 208 employs a Layer 2 protocol, such as the Inter-Switch Link (ISL) protocol developed by Cisco Corporation or IEEE 802.1 QnQ, that utilizes explicit tagging to establish multiple Layer 2 virtual local area networks (VLANs) over DFP switching network 200. Each follower switch 202 preferably applies VLAN tags (also known as service tags (S-tags)) to data frames to communicate to the recipient master switch 204 the ingress data port 210 on the follower switch 202 on which the data frame was received. In alternative embodiments, the ingress data port can be communicated by another identifier, for example, a MAC-in-MAC header, a unique MAC address, an IP-in-IP header, etc. As discussed further below, each data port 210 on each follower switch 202 has a corresponding virtual port (or vport) on each master switch 204, and data frames ingressing on the data port 210 of a follower switch 202 are handled as if ingressing on the corresponding vport of the recipient master switch 204.

Management of DFP switching network is preferably implemented by a single master switch 204, for example, master switch 204a, herein referred to as the managing master switch. In event of a failure of managing master switch 204a (as detected by the loss of heartbeat messaging with managing master switch 204a via master link 208), another master switch 204b, which may be predetermined or elected from among the remaining operative master switches 204, preferably automatically assumes the role of the managing master switch 204a and implements centralized management and control of the DFP switching network 200. In preparation for a failover operation, managing master switch 204a pushes its image information to other master switches 204, thus enabling seamless failover.

Figure 3:
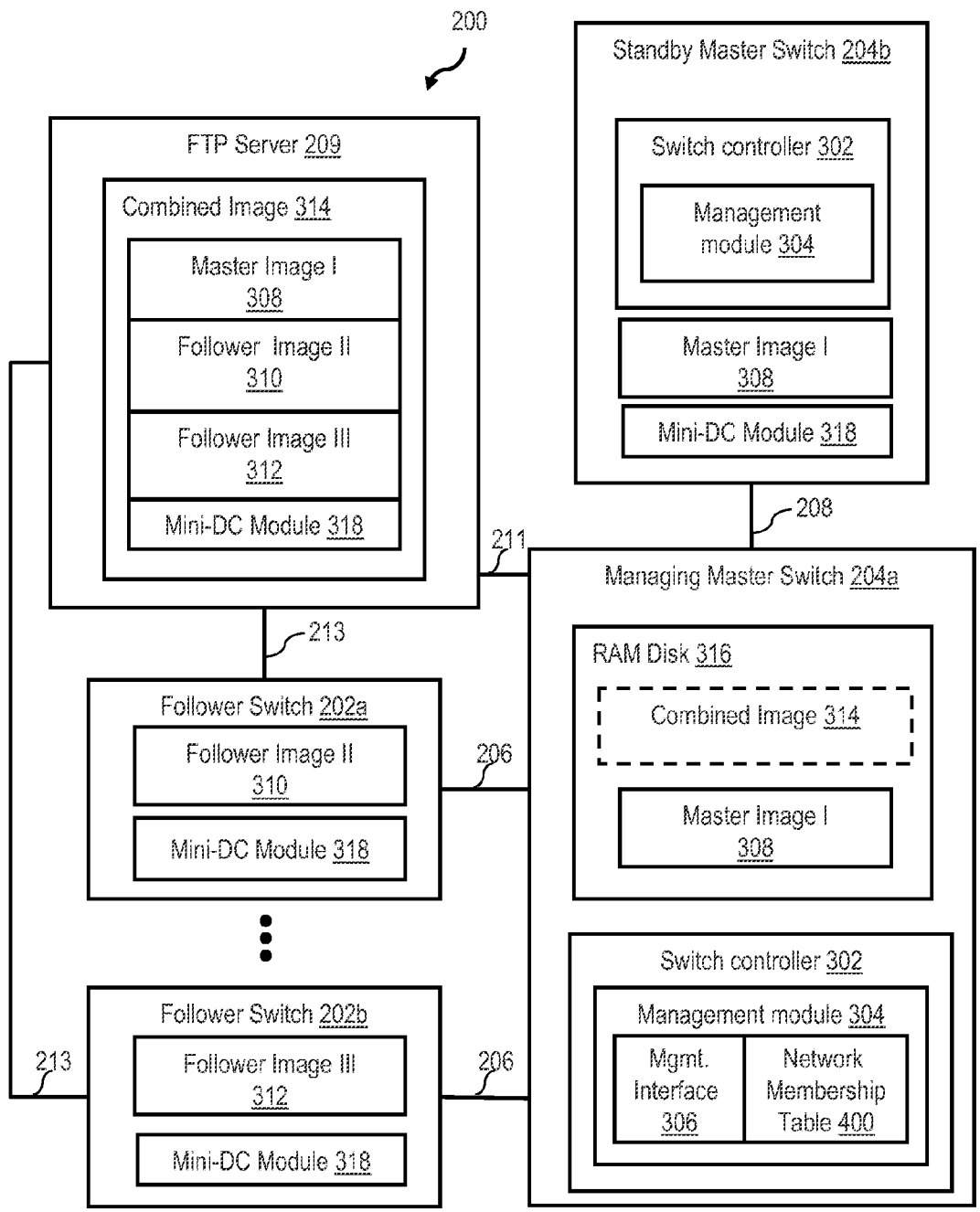
FIG. 3 is a more detailed block diagram of the DFP switching network architecture in FIG. 2 in accordance with one embodiment.

With reference now to FIG. 3, there is illustrated a more detailed block diagram of features of exemplary DFP switching network 200 of FIG. 2 that may be employed to manage image updates in a homogenous or heterogeneous packet-switched network of member switches.

To switch data frames, each member switch 202, 204 within DFP switching network 200 generally includes a plurality of data ports, a switching fabric and a switch controller, which can be implemented with one or more centralized or distributed, special-purpose or general-purpose processing elements or logic devices that implement control entirely in hardware, or more commonly, through the execution of firmware and/or software by a processing element. In master switches 204, the switch controller 302 includes a management module 304 for managing DFP network 200. In a preferred embodiment, only the management module 304 of the managing master switch (i.e., managing master switch 204a or another master switch 204b operating in its stead) is operative at any given time.

Management module 304 preferably includes a management interface 306, for example, an XML or HTML interface accessible to an administrator stationed at a network-connected administrator console (e.g., one of clients 110a-110c) in response to login and entry of administrative credentials. Management module 304, which permits the administrator to centrally manage and control all member switches of DFP switching network 200, preferably presents via management interface 306 a global view of all ports residing on all switches (e.g., master switches 204 and follower switches 202) in a DFP switching network 200.

Figure 4:
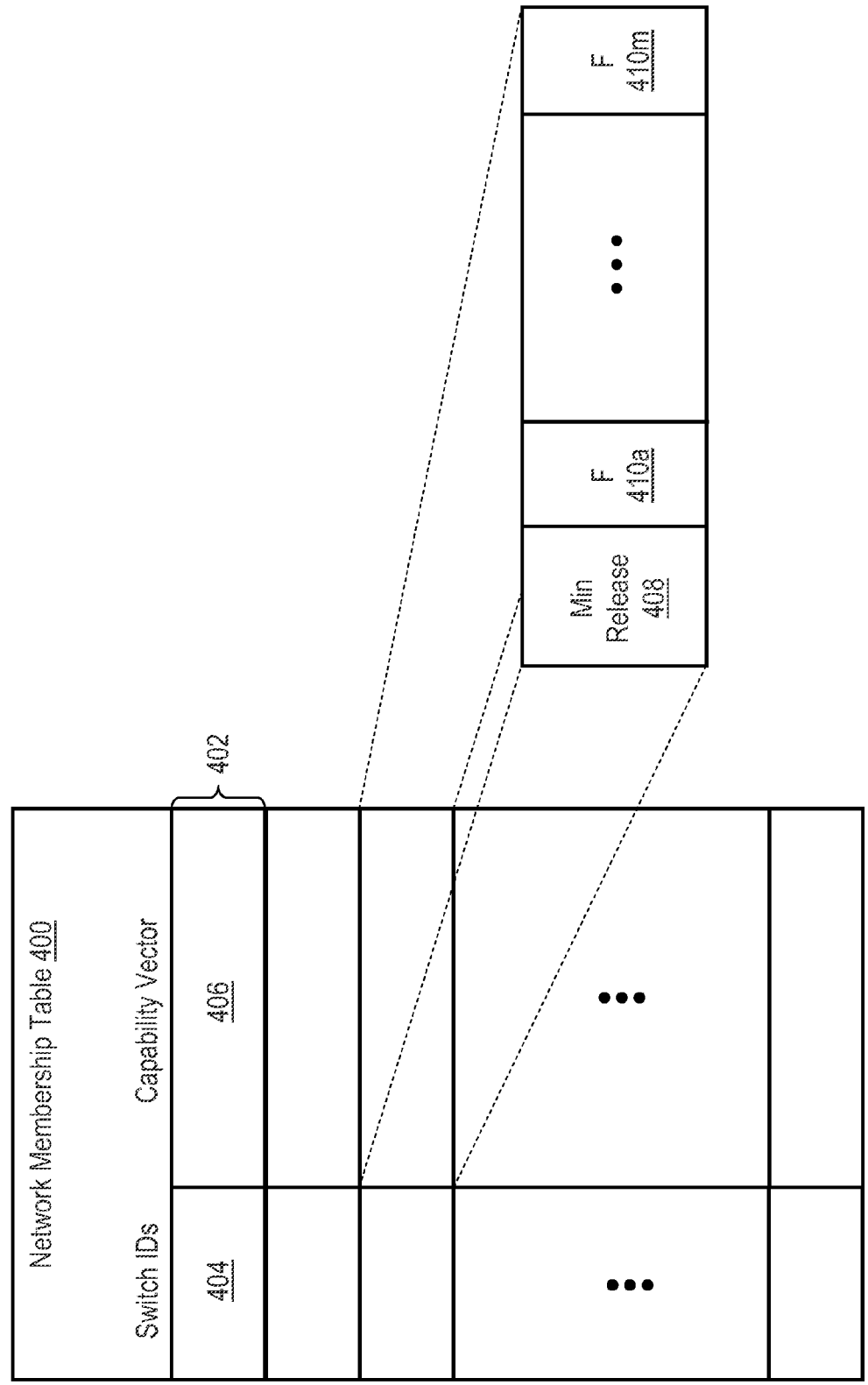
FIG. 4 is more detailed view of the network membership table in FIG. 3 in accordance with one embodiment.

As further shown in FIG. 3, management module 304 preferably additionally includes a network membership table 400, an exemplary embodiment of which is depicted in greater detail in FIG. 4. As shown in FIG. 4, network membership table 400 includes n entries 402 each corresponding to a different switch system configuration, as defined by its hardware features. Each entry 402 includes a switch ID field 404 identifying the member switch(es) in DFP switching network 200 having that switch system configuration, as well as a capability vector 406 characterizing the switch system configuration. In the depicted exemplary embodiment, each capability vector 406 includes a minimum release field 408 for identifying the minimum software release version that can be utilized to run that switch system configuration. In addition, each capability vector 406 includes a plurality of feature fields 410a-410m each indicating for a respective one of a set of multiple possible hardware or software switch features whether the feature is required, optional or not supported in the switch system configuration.

Referring again to FIG. 3, in the depicted embodiment, DFP network system 200 is heterogeneous in that, while master switches 204 all operate under a common image (i.e., master image 1308), follower switches 202a and 202b operate under different images (i.e., follower image II 310 and follower image III 312, respectively). To efficiently manage and deploy these different switch images, managing master switch 204a preferably builds and maintains a combined image 314 of all switch images currently supported in DFP switching network 200. Due to the potentially large number of different switch images that can be supported, combined image 314 can have a large storage footprint. For this reason, combined image 314 is preferably stored and maintained at a remote file storage location, such as File Transfer Protocol (FTP) server 209. However, in at least some embodiments, combined image 314 can alternatively or additionally be stored within RAM disk 316 of managing master switch 204a (as depicted by dashed lines in FIG. 3).

As further illustrated in FIG. 3, each member switch 202, 204 and combined image 314 preferably includes a mini-DC module 318. Mini-DC module 318 is a very reliable, compact and lightweight image capable of booting the member switches 202, 204 of DFP switching network 200 and providing a minimal set of functionality, including communication with master switches 204. Because of its more limited feature set, mini-DC module 318 has a smaller storage footprint than the regular images 308, 310 and 312 utilized to operate switches 202, 204. In event of a crash of a member switch 202 or 204, for example, when updating its image, mini-DC module 318 will automatically boot the crashed member switch to an operational state in which communication with master switches 204 is restored, enabling automated recovery from the crash and retry of the image update.

Figure 5:
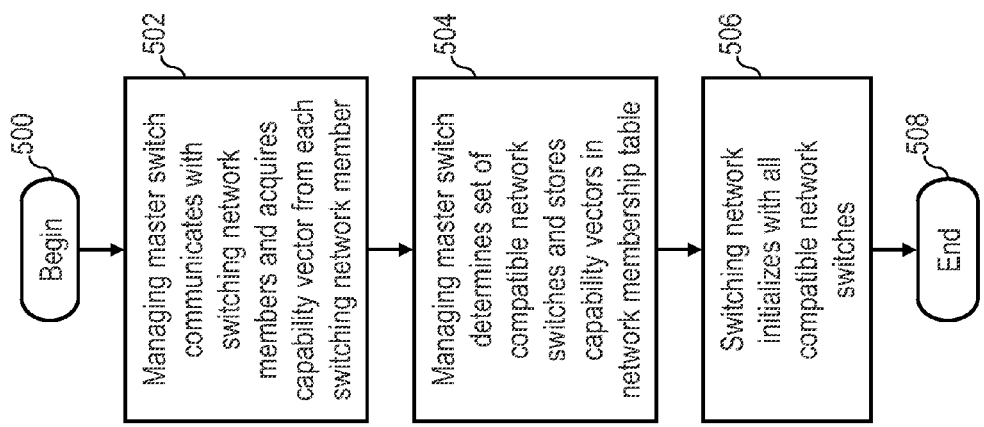
FIG. 5 is a block diagram including additional details of the File Transfer Protocol (FTP) server in FIGS. 2-3 in accordance with one embodiment.

With reference now to FIG. 5, there is illustrated a high level logical flowchart of an exemplary process for initializing a DFP switching network in accordance with one embodiment. For convenience, the process of FIG. 5 is described with reference to DFP switching network 200 of FIGS. 2-3. As with the other logical flowcharts illustrated herein, steps are illustrated in logical rather than strictly chronological order, and at least some steps can be performed in a different order than illustrated or concurrently.

The process of FIG. 5 begins at block 500 and then proceeds to block 502, which depicts managing master switch 204a communicating with all network switches with which it is directly connected via server-switch links 211 and 213 and acquiring the capability of each such network switch (block 602). For example, in one embodiment, managing master switch 204a may first learn the switches to which it is connected via an automated switch discovery protocol implemented by management module 304. Based upon the discovered pool of directly connected network switches, management module 304 of managing master switch 204a issues a capability vector request to each connected switch, which results in each of the discovered switches directly connected to managing master switch 204a reporting a capability vector (e.g., of the form shown in FIG. 4) to managing master switch 204a. Alternatively or additionally, each network switch connected to managing master switch 204a may autonomously report its capability vector to managing master switch 204a, for example, in conjunction with a "join" request transmitted to managing master switch 204a following boot of an image on the network switch.

In response to acquiring the capability vectors of the network switches to which it is connected, managing master switch 204a determines a set of the network switches running compatible images and records the identities of the compatible network switches and their capability vectors in network membership table 400 (block 504). In addition, managing master switch 204a initializes the identified set of compatible network switches as member switches 202, 204 of DFP switching network (block 506). Switches running under incompatible images, if any, are not permitted to immediately join DFP switching network 200, and while capable of communication with master switches 204, remain under independent management and control until these excluded switches are updated to run under a compatible image, as described below with reference to FIG. 6. The process of FIG. 5 thereafter ends at block 508.

Figure 6:
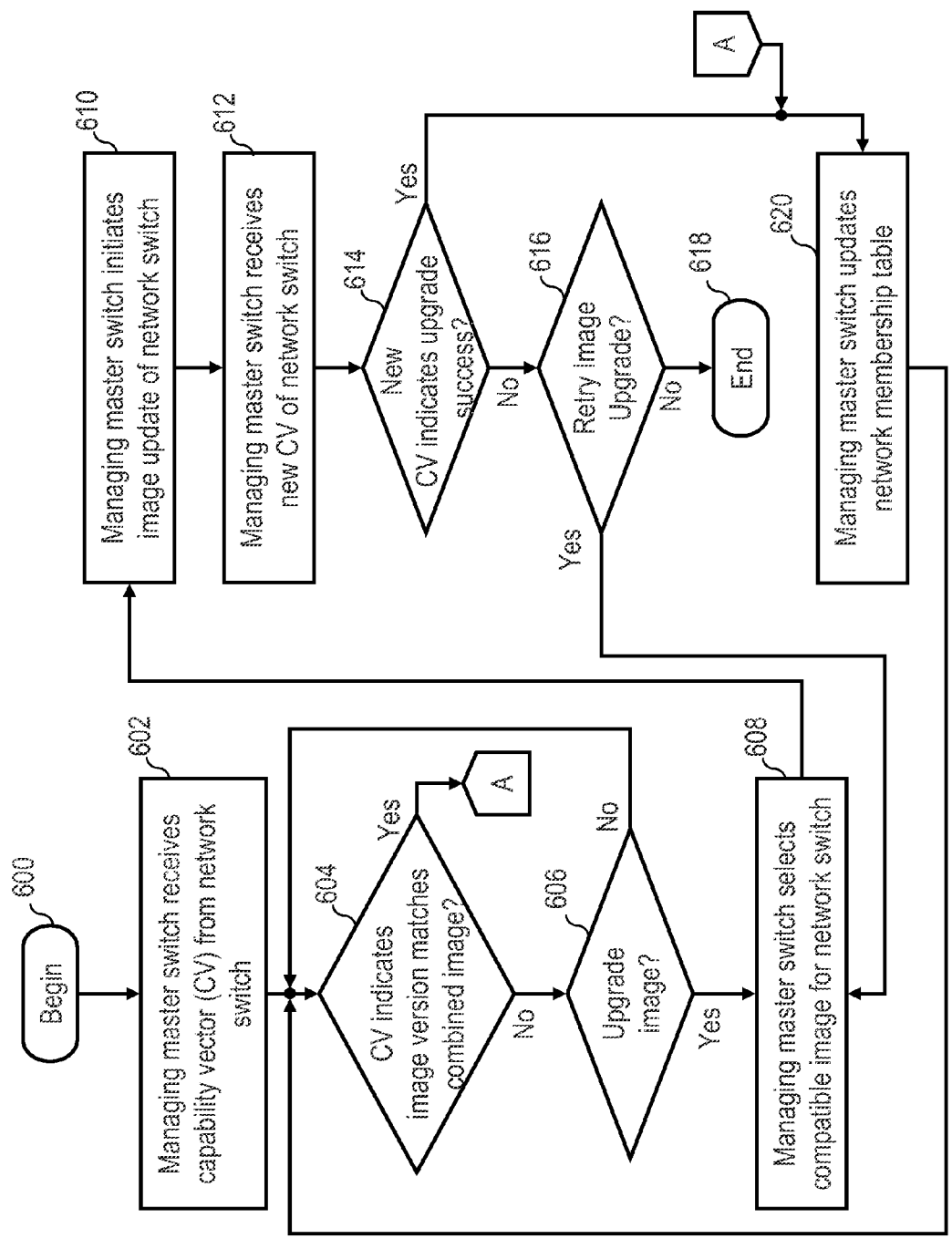
FIG. 6 is a high level logical flowchart of an exemplary process for initializing a DFP switching network in accordance with one embodiment.

With reference now to FIG. 6, there is depicted a high level logical flowchart of an exemplary process for managing the update of a network switch in accordance with one embodiment. For ease of understanding, the process will be described with reference to DFP switching network 200 as depicted in FIGS. 2-3.

The illustrated process begins at block 600 and then proceeds to block 602, which depicts managing master switch 204a of DFP switching network 200 receiving a capability vector from a network switch to which it is directly connected by an inter-switch link 211, 213. The capability vector preferably reports the current version of the image running on the network switch. In response, managing master switch 204a determines, via its management module 304, whether the image version reported by the network member is the same as that contained in the combined image 314. If the image versions match, no image update is necessary, and the process proceeds through page connector A to block 620, which is described below.

If, however, managing master switch 204a detects a difference in image versions at block 604, managing master switch 204a determines whether the difference in image versions merits an update of the member switch's image (block 606). In this regard, it should be noted that it is not always necessary that managing master switch 204a and member switches 202, 204 have the same image version. For example, a follower switch 202 may have a higher release number than managing master switch 204a and still share the same capability vector. For this reason, in one embodiment, decision block 606 represents a comparison between the capability vector acquired from the network switch with the capability of the corresponding entry 402 in membership table 400 to determine whether difference in versions causes an incompatibility in capabilities between the images.

Incompatibility between an installed image and a more recent image within combined image 314 can arise for a number of reasons. For example, one source of incompatibility is a hardware or software update of some, but not all of member switches 202, 204. Such an update can lead to an installed image version not supporting a feature that the image version in combined image 314 requires. Other causes of incompatibility include, but are not limited to, protocol updates and changes in management and control data. It should therefore be appreciated that incompatibilities between switch images are not limited to those caused by data plane changes, but can be caused by changes along any of the network planes, including the management plane, control plane, and/or data plane.

If no incompatibility is detected at block 606, the process can return to block 604, and no switch image update is required. However, if an incompatibility is detected at block 606 (or if managing master switch 204a optionally determines to update the image despite its compatibility), managing master switch 204a automatically selects a compatible image version to which the network switch will be updated (block 608). Typically, managing master switch 204a initially searches FTP server 209 to locate a compatible image with which to perform the image update. If FTP server 209 is not configured or is unavailable, managing master switch 204a searches its own local file system (e.g., RAM disk 316) to locate the compatible image.

Upon locating the compatible image, managing master switch 204a initiates the update of the incompatible network switch (block 610). In one preferred embodiment, managing master switch 204a communicates a push request to FTP server 209 to push the updated switch image to the incompatible network switch. Alternatively, managing master switch 204a can communicate a download command to the incompatible member switch, which would in turn download the image directly from FTP server 209. In another alternative embodiment, managing master switch 204a may push the compatible image from its local file system (e.g., RAM disk 316).

Next, at block 612, managing master switch 204a receives a revised capability vector from the previously incompatible network switch and updates network membership table 400. As depicted in decision block 614 managing master switch 204a determines whether the newly received capability vector indicates a successful update of the previously incompatible network switch. If the update was successful, that is, the compatibility vector reported the image selected by managing master switch 204a at block 608, the process passes to block 620, which depicts managing master switch 204a updating network membership table 400 with the switch ID and feature information from the compatibility vector. The process thereafter returns to decision block 604. However, if managing master switch 204a determines at block 614 that the update was not successful, managing master switch 204a decides at block 616 whether to retry the update to the image of the incompatible network switch. If so, the process returns to block 608, which depicts managing master switch 204a selecting a possibly different compatible image with which to update the network switch. However, if managing master switch 204a does not elect to retry the image update, the process terminates at block 618.

Figure 7:
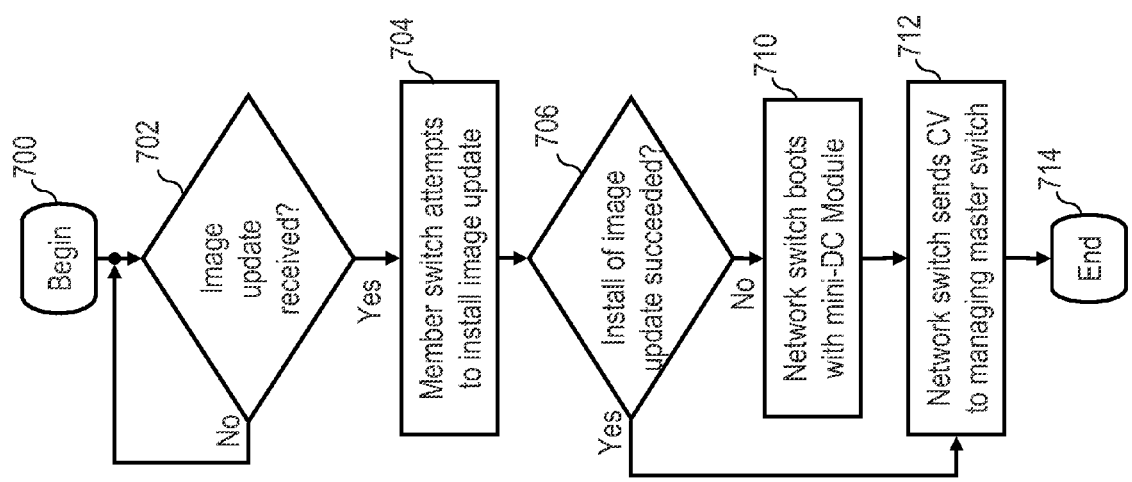
FIG. 7 is a high level logical flowchart of an exemplary process for managing the update of an incompatible member switch in accordance with one embodiment.

With reference now to FIG. 7, there is illustrated a high level logical flowchart of an exemplary process for recovering network communication between a network switch and managing master switch 204a in the event of an image update failure in accordance with one embodiment. For ease of understanding, the process of FIG. 7 is also described with reference to DFP switching network 200 of FIG. 2.

The depicted process begins at block 700 and thereafter proceeds to block 702, which depicts a network switch that is directly connected to managing master switch 204a determining whether an image update has been received (e.g., due to managing master switch 204a pushing an updated image or commanding the network switch to pull the updated image). If not, the process iterates at block 702. If, however, an image update has been received, the network switch attempts to install the image update (block 704). As indicated at block 706, if the installation is successful, the process passes to block 712, which depicts the network switch transmitting a new capability vector to managing master switch 204a, as discussed above with reference to block 612 of FIG. 6. Thereafter, the image update process of FIG. 7 ends at block 714.

Returning to block 706, if the installation of the updated image fails, meaning that the network switch has crashed, the network switch boots with mini-DC module 318 (block 710). Mini-DC module 318 is pre-loaded when the network switch is first initialized and serves as a backup/default OS that loads in the event of an image update failure. While mini-DC module 318 contains all the basic hardware and configuration-related information, mini-DC module 318 has a fixed capability vector, which the network switch reports to managing master switch 204a at block 712. In response to receipt of this fixed capability vector, managing master switch 204a will discover an incompatibility when the fixed capability vector is compared to that listed in network membership table 400, which will trigger managing master switch 204a initiating an update to the incompatible image (as discussed above with reference to FIG. 6). Following block 712, the process depicted in FIG. 7 terminates at block 712.

As has been described, a switching network has a plurality of switches including at least a switch and a managing master switch. At the managing master switch, a first capability vector (CV) is received from the switch. The managing master switch determines whether the first CV is compatible with at least a second CV in a network membership data structure that records CVs of multiple switches in the switching network. In response to detecting an incompatibility, the managing master switch initiates an image update to an image of the switch. In response to a failure of the image update at the switch, the switch boots utilizing a mini-DC module that reestablishes communication between the switch with the managing master switch and retries the image update.

While the present invention has been particularly shown as described with reference to one or more preferred embodiments, it will be understood by those skilled in the art that various changes in form and detail may be made therein without departing from the spirit and scope of the invention. For example, although aspects have been described with respect to one or more machines (e.g., FTP server and/or network switches) executing program code (e.g., software, firmware or a combination thereof) that direct the functions described herein, it should be understood that embodiments may alternatively be implemented as a program product including a tangible machine-readable storage medium or storage device (e.g., an optical storage medium, memory storage medium, disk storage medium, etc.) storing program code that can be processed by a machine to cause the machine to perform one or more of the described functions.

What is claimed is:

1. A method of managing a system image update in a switching network having a managing master switch and a plurality of switches managed by the managing master switch and coupled to the managing master switch by a respective one of the multiple links, the method comprising:
   at the managing master switch, receiving a first capability vector (CV) from a switch among the plurality of switches at the managing master switch via the respective one of the plurality of links, wherein the first CV characterizes a system configuration of the switch;
   the managing master switch determining whether the first CV is compatible with at least a second CV in a network membership data structure that records CVs of multiple switches in the switching network;
   in response to detecting an incompatibility, the managing master switch initiating an image update to an image of the switch; and
   in response to a failure of the image update at the switch, reestablishing communication between the managing master switch and the switch as booted under a mini-DC module and thereafter retrying the image update.

2. The method of claim 1, wherein:
   the incompatibility is in at least one of a control plane and a management plane of the switch.

3. The method of claim 1, wherein:
   each of the first and second compatibility vectors (CV) indicates whether each feature in a feature set of multiple switch features is supported, as well as a minimum image version corresponding to the feature set.

4. The method of claim 1, wherein:
   the switching network is a heterogeneous packet-switched network; and
   the image of the switch differs from an image of the managing master switch.

5. The method of claim 1, and further comprising:
   the managing master switch detecting failure of the image update based on receipt of a third CV corresponding to a feature set of the switch operating under the mini-DC module.

6. The method of claim 1, wherein:
   the method further comprises the managing master switch building a combined image including a respective image for each of multiple switches in the switching network; and the initiating the image update includes initiating the image update to the switch from the combined image.

7. The method of claim 1, wherein:

the managing master switch provides common data, control and management planes for member switches in the switching network; and the method further comprises the managing master switch joining the switch to the switching network in response success of the image update at the switch.

8. The method of claim 1, wherein:

the image of the switch is a first image;

the image update is a first image update; and the method further comprises:

- in response to receipt of the first image update, the switch attempting to update the switch from the first image to the second image; and
- in response to a failure of the image update at the switch, the switch automatically booting under the mini-DC module, reestablishing communication with the managing master switch, and retrying an update to the switch in response to receipt of a second image update.

\* \* \* \* \*